C. E. BENTON.
FEED BAG FOR HORSES OR OTHER ANIMALS.
APPLICATION FILED SEPT. 14, 1911.
1,033,046.
Patented July 16, 1912.
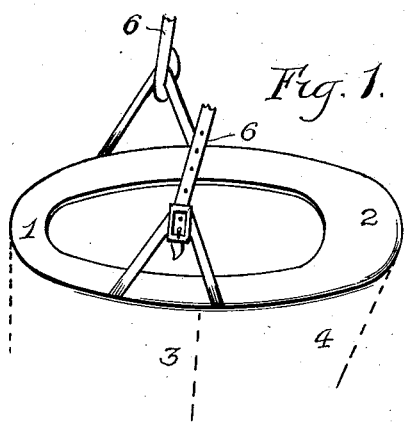
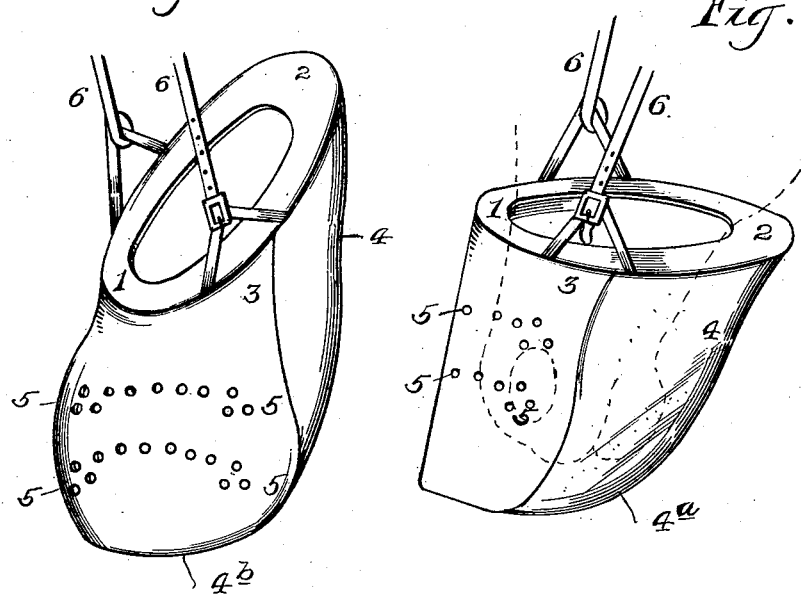
WITNESSES:
INVENTOR.
Charlotte E. Benton

UNITED STATES PATENT OFFICE.

CHARLOTTE ELIZABETH BENTON, OF NEW YORK, N. Y.

FEED-BAG FOR HORSES OR OTHER ANIMALS.

1,033,046. Specification of Letters Patent. Patented July 16, 1912.

Application filed September 14, 1911. Serial No. 649,391.

*To all whom it may concern:*

Be it known that I, CHARLOTTE ELIZABETH BENTON, a citizen of the United States, residing at New York city, in the State of New York, have invented a new and useful Feed-Bag for Horses or other Animals, of which the following is a specification.

This invention relates to feed bags for horses or other animals; and it comprises a feed bag having a lower or body portion wider transversely than longitudinally or from front to back, and provided with a bottom so shaped as to cause gravitational collection and concentration of feed in a forward portion of the bag when in use, and a flange-like top or cover for said body portion of a generally elliptical or oval form, longer from front to back than transversely, and provided with an elliptical or oval opening therethrough to permit entry of an animal's head or nose, said top serving both as means to space the animal's head away from the walls of the feed bag, and to prevent feed being accidentally thrown out of the bag; all as more fully hereinafter set forth and as claimed.

In a feed bag for horses or other animals, it is desirable among other things that the device be of such a character as to permit the animal to feed with the greatest degree of comfort and the least interference with breathing, that the feed should be constantly accessible at a locality close to the animal's mouth, and that loss of feed from the bag should be obviated. Feed bags heretofore known have generally obtained one or another of these desirable characteristics only at the sacrifice of others equally important.

In the present invention defects inherent in feed bags of the prior art have been obviated, while the desired ends are attained in a relatively simple structure.

In the accompanying drawings I have illustrated more or less diagrammatically a typical embodiment of the present invention.

In these drawings, Figure 1 is a partial side view of the upper part of the bag in perspective, the body of the bag being suggested in dotted lines; Fig. 2 is a more complete view of the bag in side perspective, the position of an animal's head while feeding being indicated in dotted lines; and Fig. 3 is a perspective showing more particularly the top and front of the bag.

Referring to the figures, the bag has a top or partial cover in the form of an elliptical or oval flange-like member 1, 2, surrounding an opening for an animal's head and fastened at its outer edges to the lower or body portion of the bag, comprising a front section 3, and a combined back and bottom section 4, the lower portion or bottom of section 4 being rounded or slanted at 4$^a$ for the purpose of inducing ready gravitational passage of feed from the rear portion of the bag bottom to the front where it will be easily accessible to the feeding animal. In furtherance of the same end, the lower edges of section 3, converge gently toward a point 4$^b$ directly in front of the animal's mouth.

As clearly shown in Fig. 3, the body of the feed bag is best somewhat broader transversely at the bottom than at the top; while the cover or top, on the contrary, is narrow transversely of the bag, its greatest dimension being longitudinally thereof. This arrangement of parts insures the maximum degree of freedom for the mouth and lower part of the head of the animal, while at the same time the transverse broadening of the bag toward its base makes ample capacity.

As indicated, the opening in the top or cover is best eccentrically disposed as regards the outer edges of the top, the rear portion 2 of the top being somewhat broader than the front portion 1. This forms a kind of pouch in the rear of the bag into which feed thrown upward and backward when the animal tosses its head, is caught and is thus prevented from being thrown out of the top of the bag. Feed so caught tends, however, to return at once to the front of the bag bottom by reason of the convergent contour of such bottom. The flange-like top or cover should of course engage the nose or lower part of the animal's head as closely as is consistent with comfort and the necessary freedom of the animal. The top thus serves to space the animal's head and nose away from the interior side walls of the bag, while permitting more or less motion toward and away from the bottom.

The body of the feed bag should be provided with suitable ventilating means, as orifices in groups in the front section of the bag. As shown, a pair of groups may be located near the bottom of the bag adjacent the position of the animal's nostrils when its mouth is near the bag bottom, and another pair of groups somewhat higher up for use when the animal's head is raised, or when the lower holes are covered by feed. The groups in each pair may be connected, if desired, by a line of smaller orifices.

Suitable means as straps 6 are provided for securing the feed bag to an animal's head, and these should be fastened to the bag at the outer edges of the top, preferably at not less than four points to give proper adjustment.

The feed bag may be constructed of any suitable material or fabric. Where fabric such as duck or canvas is employed, it is sometimes desirable to stiffen the fabric with additional pieces of the same or with leather or similar material. This is particularly advantageous in reinforcing the lower and front portion of the bag in such a manner as to preserve its contour.

What I claim is:—

In a feed bag for animals, the combination of a portion having an aperture near the center, a front body section extending forward at an angle to said portion to afford clearance for the animal's nose, the lower edges of said body section being curved toward the center thereof, a second body section suitably joined to said front section and portion, said second section forming a combined back, bottom and sides and having a rounded back and bottom contour sloping toward the front of said bag, the body of the feed bag being broader transversely at the bottom than at the top, and means for securing said bag to an animal's head.

In testimony whereof I affix my signature, in presence of two witnesses.

CHARLOTTE ELIZABETH BENTON.

Witnesses:
FRED S. ALLEN,
HATTIE S. ALLEN.

Copies of this patent may be obtained for five cents each, by addressing the "Commissioner of Patents, Washington, D. C."